US008843507B2

(12) United States Patent
Xiao et al.

(10) Patent No.: US 8,843,507 B2
(45) Date of Patent: Sep. 23, 2014

(54) SERVING MULTIPLE SEARCH INDEXES

(75) Inventors: Jianyong Xiao, Issaquah, WA (US); Yi Li, Redmond, WA (US); Yanbiao Zhao, Redmond, WA (US); Xun Kang, Kirkland, WA (US); Pin Lu, Bellevue, WA (US); Ashish Consul, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 187 days.

(21) Appl. No.: 13/073,283

(22) Filed: Mar. 28, 2011

(65) Prior Publication Data

US 2012/0254148 A1    Oct. 4, 2012

(51) Int. Cl.
G07F 17/30    (2006.01)
G06F 17/30    (2006.01)

(52) U.S. Cl.
CPC .... *G06F 17/30312* (2013.01); *G06F 17/30533* (2013.01)
USPC ........... 707/764; 707/770; 707/771; 707/741; 707/723; 707/708

(58) Field of Classification Search
CPC ................... G06F 17/30545; G06F 17/30312; G06F 17/30911; G06F 17/30477; G06F 17/30533; G06F 17/30619; G06F 17/30336; G06F 17/30; G06F 17/30321; G06F 17/30613; G06F 17/30864; G06F 17/3002; G06F 17/30634
See application file for complete search history.

(56) References Cited

U.S. PATENT DOCUMENTS

| | | | |
|---|---|---|---|
| 6,983,322 B1* | 1/2006 | Tripp et al. | 709/225 |
| 7,240,069 B2 | 7/2007 | Samsonov | |
| 7,676,553 B1 | 3/2010 | Laucius et al. | |
| 7,725,453 B1* | 5/2010 | Chen et al. | 707/711 |
| 7,725,470 B2* | 5/2010 | Richards et al. | 707/737 |
| 7,966,332 B2* | 6/2011 | Altevogt et al. | 707/741 |
| 8,015,170 B2* | 9/2011 | Badros et al. | 707/706 |
| 8,027,966 B2* | 9/2011 | Drissi et al. | 707/706 |
| 8,195,642 B2* | 6/2012 | Barsness et al. | 707/713 |
| 8,510,290 B1* | 8/2013 | Brown et al. | 707/711 |
| 2006/0004717 A1 | 1/2006 | Ramarathnam | |
| 2009/0248629 A1* | 10/2009 | Marin | 707/3 |
| 2010/0114970 A1* | 5/2010 | Marin | 707/802 |
| 2011/0113052 A1* | 5/2011 | Hornkvist | 707/759 |
| 2012/0158718 A1* | 6/2012 | Transier et al. | 707/730 |

OTHER PUBLICATIONS

Multiple indexes on a single server instance—Retrieved Date: Dec. 24, 2010 http://www.mail-archive.com/nutch-user@lucene.apache.org/msg04730.html.
Single Table Access Using Multiple Indexes: Optimization, Execution, and Concurrency Control Techniques—Retrieved Date: Dec. 24, 2010 http://www.mail-archive.com/nutch-user@lucene.apache.org/msg04730.html.
Combining Multiple Indexes—Retrieved Date: Dec. 24, 2010 http://www.postgresql.org/docs/8.3/static/indexes-bitmap-scans.html.

(Continued)

*Primary Examiner* — Michelle Owyang
(74) *Attorney, Agent, or Firm* — Dave Ream; Doug Barker; Micky Minhas

(57) ABSTRACT

Multiple search indexes can be served from a common set of resources. Instead of requiring a processor to be dedicated to serving a single search index, a processor can provide responsive documents for search queries that are based on different ranking algorithms and/or different sets of documents.

19 Claims, 7 Drawing Sheets

(56) References Cited

OTHER PUBLICATIONS

Single table query multiple indexes—Retrieved Date: Dec. 24, 2010 http://bytes.com/topic/db2/answers/183993-single-table-query-multiple-indexes.

Merging Indexes—Retrieved Date: Dec. 24, 2010 http://www.sxlist.com/techref/language/asp/ix/ixindmer.htm.

Indexing with Microsoft Index Server—Retrieved Date: Dec. 24, 2010 http://msdn.microsoft.com/en-us/library/dd582937%28v=office.11%29.aspx.

* cited by examiner

SERVING MULTIPLE SEARCH INDEXES

BACKGROUND

Keyword searching of large document collections has become a routine activity for many types of businesses and consumers. The interface provided to a user for performing a keyword search can be relatively simple, and lists of responsive documents are often provided in a few seconds or less. However, extensive resources are required to provide this functionality. This can include large groupings of computers that can maintain information about the documents in a large document collection, and that can further allow for rapid identification of documents that are responsive to search queries.

SUMMARY

In various embodiments, methods are provided for allowing multiple search indexes to be served from a common set of resources. Instead of requiring a processor to be dedicated to serving a single search index, a processor can provide responsive documents for search queries that are based on different ranking algorithms and/or different sets of documents.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
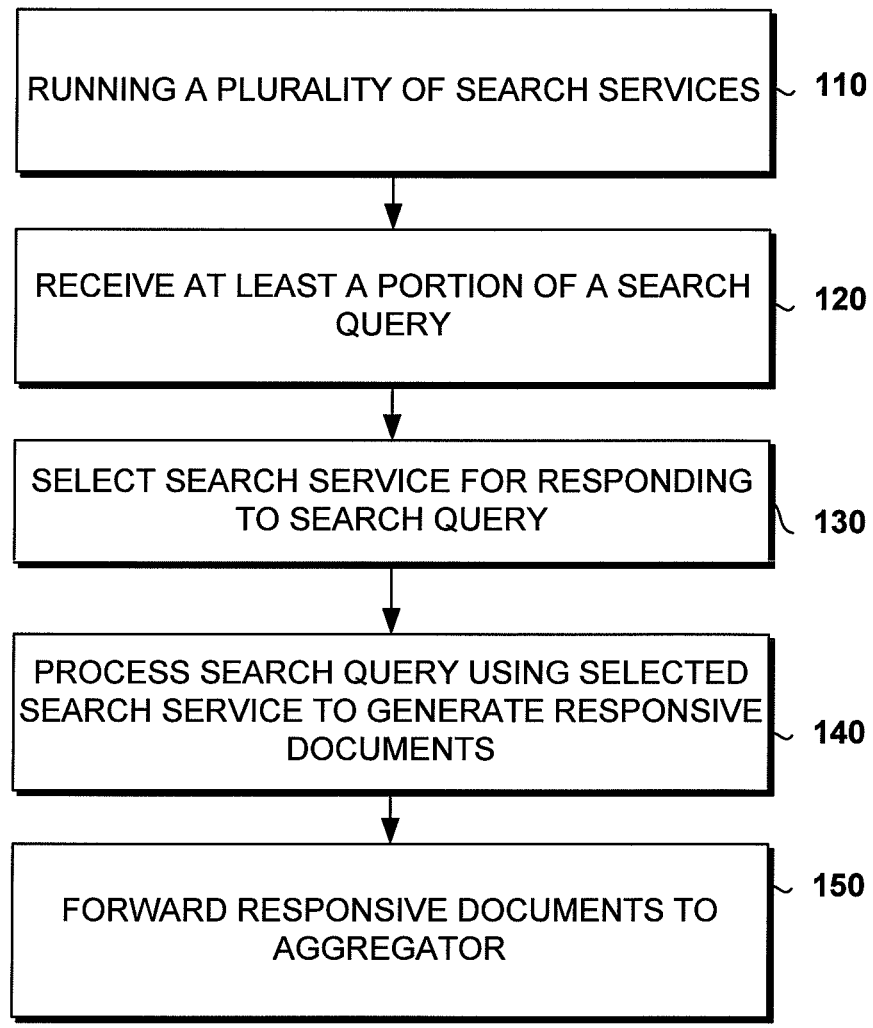
FIGS. 1-3 show examples of methods according to various embodiments of the invention.

In various embodiments, systems and methods are provided for allowing multiple search indexes to be served from a common set of computer resources. The systems and methods can allow one or more processors to participate in providing search results for queries addressed to different search indexes. This can include allowing a processor to maintain search index information about disparate document collections and/or maintaining multiple types of search index information about the same document collection.

Documents available via internet or "www" addresses represent a commonly accessed large document collection. A number of search engines are available that can allow users to identify documents from such a large document collection based on keywords and/or other types of search query information. To support such search engine technology, large collections of computers may be required, so that results can be provided to a user with as small a delay as possible.

One difficulty with conventional methods for supporting search engine technology can be that the computer resources supporting a search index are dedicated resources. These dedicated computer resources can include processors, associated memory, and possibly other types of resources. When such computer resources are used in support of a first search index, this can prevent those resources from being available to support any other search indexes. For example, a search engine may have several indexes associated with providing responsive documents for the search engine. In addition to an index for the main document collection, other indexes may be available such as an index for advertisements, an index for providing specific answers based on query terms, or other indexes that can provide information that supplements the information returned to a user in response to a search query. In this type of example, a separate set of computer resources can be required for serving each type of search index. As a result, each new type of search index can require the addition of more computer resources, leading to increased costs.

In various embodiments, instead of requiring a distinct set of computer resources for each different search index, the computer resources can be configured to allow one or more processors to participate in serving a plurality of search indexes. This new type of configuration can be enabled by the method for serving multiple search indexes described below. As a result, instead of a computer resource having a dedicated function of serving a single index, the computer resource can have the ability to distinguish between search queries and apply the query against the appropriate index. This can reduce the resources needed to maintain multiple search indexes. This can also facilitate testing of new types of search indexes. Additionally, this can allow for improved utilization of computer resources, such as utilization of resources during off-peak times for a particular search index. Still another advantage can be that computer resources can be used to simultaneously identify results responsive to queries associated with different search services.

In an embodiment, multiple indexes can be served from a processor. An example of such an embodiment is shown in FIG. 1. For example, a processor can run 110 a plurality of search services, such as a first search service and a second search service. A search service can refer to an application or program that matches or ranks documents from a search index with a search query based on a ranking algorithm. Optionally, the first search service and the second search service can have different ranking algorithms. The processor can have access to a subset of document chunks associated with the first search service and the second search service. Thus, the search services on the processor can generate results that are intended for aggregation with results from other similar search services on other processors.

The processor can then receive 120 at least a portion of a search query. The at least a portion of a search query can represent a full search query provided by an initial search requestor. Alternatively, the at least a portion of a search query can be a query that has been stripped of information not relevant to a search service on the processor. Still another option can be that the portion of the search query represents a search query that has been modified, such as a query where the spelling of a keyword has been changed to match a more popular keyword and/or to correspond to a keyword found in a dictionary.

A search service for responding to the at least a portion of a search query can then be selected 130. The search service can be selected by any convenient method. The search service can be selected based on the port specified when the portion of the search query was received. Alternatively, the search service can be selected based on a keyword or token in the search query. Still another option can be to have a search service on the processor that is designated as the active search service. The designated search service at the time a query is received can then be selected.

The at least a portion of a search query can then be processed 140 using the selected search service to generate a plurality of responsive documents. The plurality of responsive documents can be based on the documents associated with the selected search service that the processor has access to. The responsive documents can be determined based on a ranking algorithm associated with the search service. The plurality of responsive documents can then be forwarded 150 to an aggregator associated with the selected search service.

It is noted that the flow chart in FIG. 1 describes actions related to processing a single query. In various embodiments, a processor can have access to documents related to more than one search index and/or search service. A processor can receive search query information for a second query while still performing the processing for a first query. The first and second queries can be associated with documents related to different search indexes and/or search services. As a result, a processor can perform processing on a first query associated with a first search index and/or search service during a time when processing is also being performed on a second query associated with a second search index and/or search service.

Figure 2:
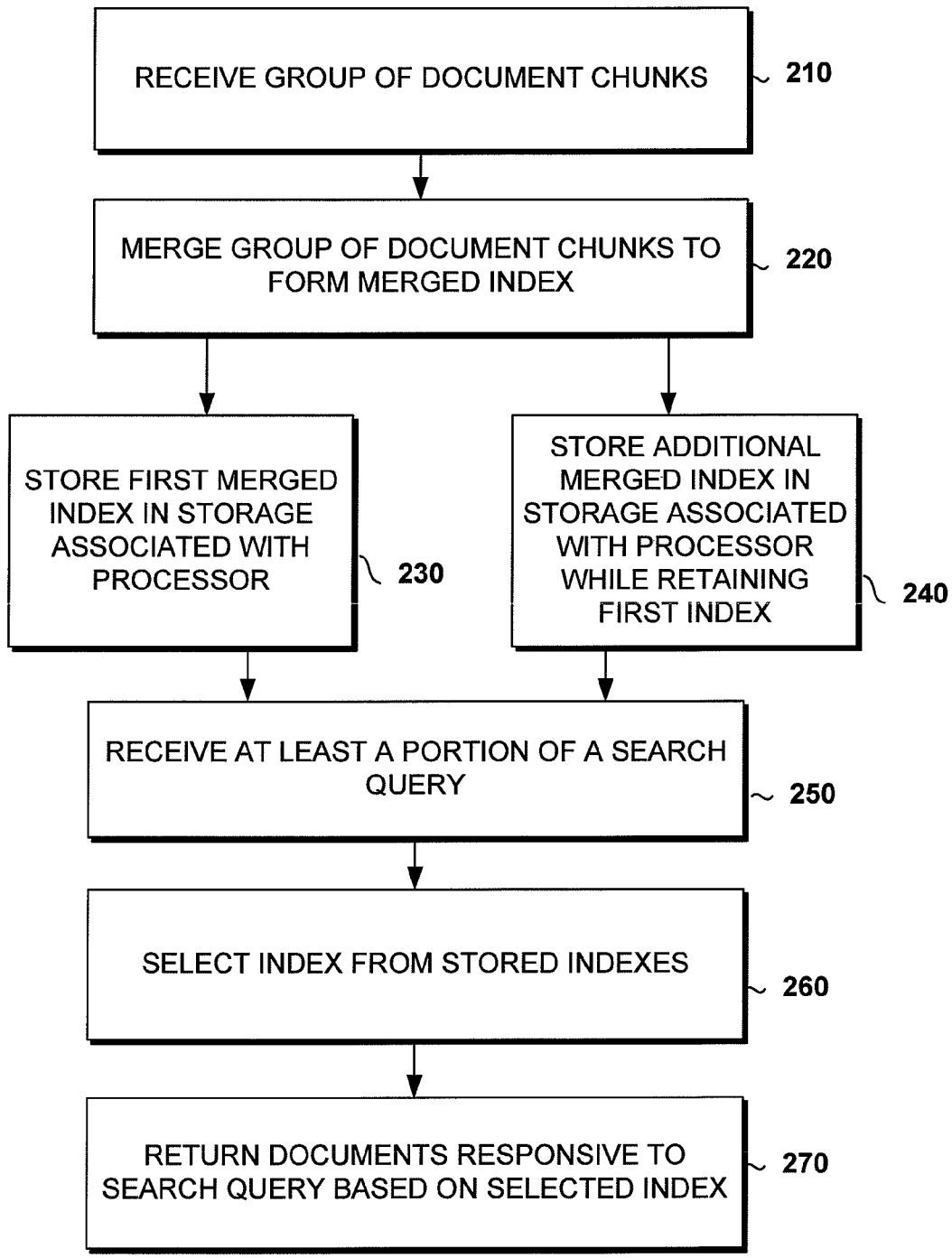

In another embodiment, a method can be provided for serving multiple indexes from a processor. An example of such an embodiment is shown in FIG. 2. The method can include receiving 210 a first group of document chunks. The document chunks can represent a subset of the documents associated with a search index. The first group of document chunks can be merged 220 to form a first merged index. The first merged index can correspond to a first search index. The merged index can represent the portion of the first search index that the processor will handle during processing of a search query. The first merged index can be stored 230 in storage associated with a processor. The above processes for receiving 210 and merging 220, and can be repeated as desired to provide multiple merged indexes. The additional merged indexes can be stored 240 in the storage associated with the processor, while still retaining the first (other) merged indexes in the storage associated with the processor. This can allow the processor to have access to document information from multiple indexes. For convenience in understanding, the remainder of this embodiment will be described using an example involving only a first search index and a second search index. However, it is understood that any convenient number of search indexes could be stored and available for use.

At least a portion of a search query can then be received 250. The at least a portion of a search query can represent a full search query provided by an initial search requestor. Alternatively, the at least a portion of a search query can be a query that has been stripped of information not relevant to a search service on the processor. Still another option can be that the portion of the search query represents a search query that has been modified, such as a query where the spelling of a keyword has been changed to match a more popular keyword and/or to correspond to a keyword found in a dictionary.

A stored index is then selected 260 from the first merged index or the second merged index. The search index can be selected by any convenient method. The search index can be selected based on the port specified when the portion of the search query was received. Alternatively, the search index can be selected based on a keyword or token in the search query. Still another option can be to have a search index on the processor that is designated as the active search index. The designated search index at the time a query is received can then be selected.

Documents can then be returned 270 that are responsive to the at least a portion of a search query based on matching the at least a portion of a search query with documents from the selected index. The documents can be returned, for example, to an aggregator that will combine the returned documents with the results from other processors associated with the same search index.

Figure 3:
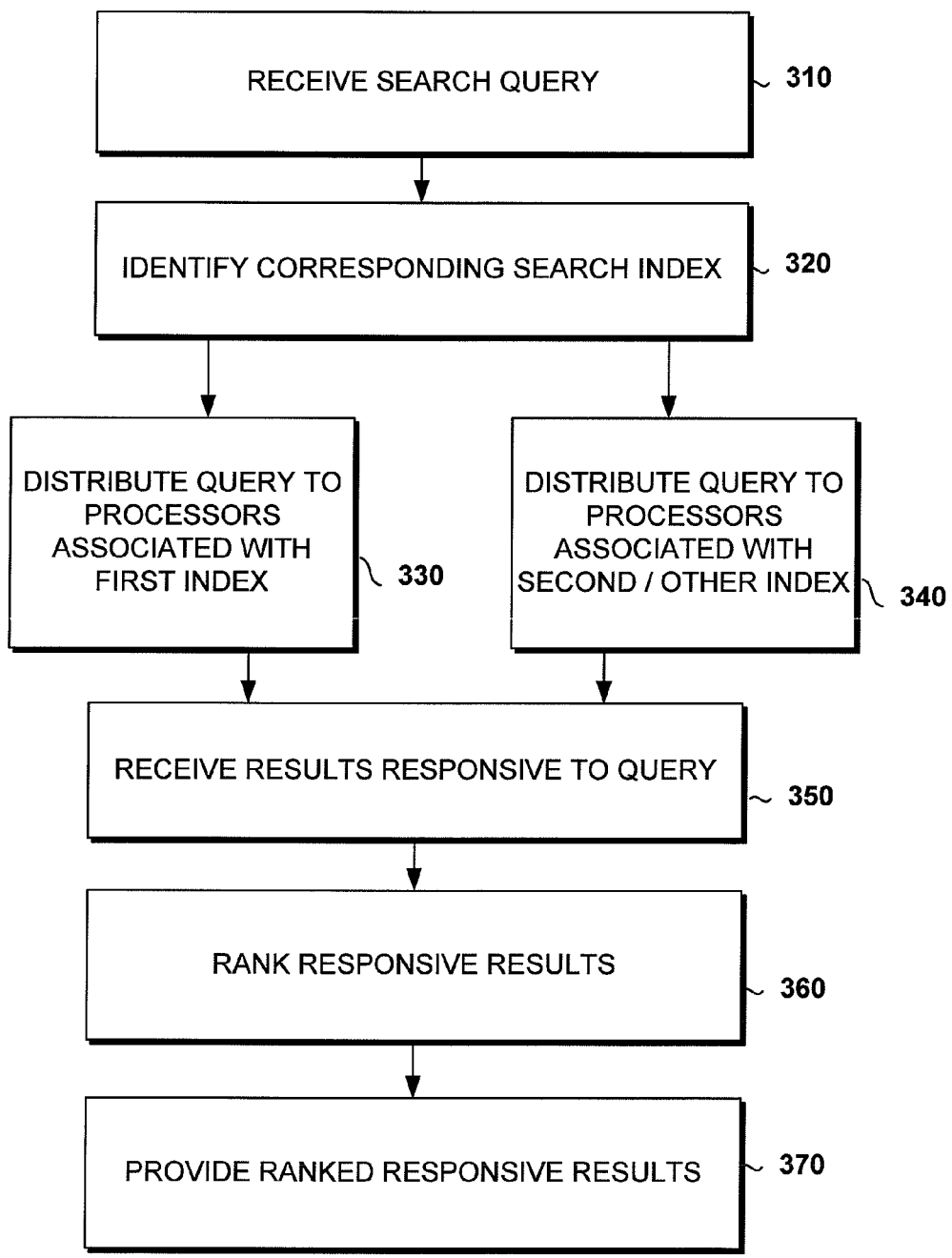

In still another embodiment, a method can be provided for returning responsive results to multiple search queries based on a common set of resources. An example of such an embodiment is shown in FIG. 3. A first search query can be received 310. A first search index corresponding to the first search query can be identified 320. The first search index can be identified in any convenient manner. This can include identifying the first search index based on parsing the query. One or more keywords and/or tokens within the query may indicate a search index that can be selected. Alternatively, the first search index can be identified based on a port where the search query was received.

At least a portion of the first search query can be distributed 330 to a plurality of processors associated with the first search index. The entire first search query can be distributed. Alternatively, information that is not needed by the plurality of processors may be removed prior to forwarding the query. Still another option can be that the query is modified in some way prior to forwarding the query to the plurality of processors.

Results responsive to the first search query can then be received 350 from the plurality of processors associated with the first search index. For example, each of the plurality of processors can be responsible for a portion of the documents associated with the first search index. The various processors can return separate results based on the query. The responsive results can be ranked 360. This ranking can, for example, allow for aggregation of the results from the plurality of processors into a single ranked list. The ranked responsive results can then be provided 370 in response to the first search query, such as by returning the results to the entity that initiated the search query.

The processes for receiving a query 310 and identifying a search index 320 can be repeated as convenient to allow queries to be received that correspond to various search indexes. As different indexes are identified for queries, at least a portion of a query can be distributed to a plurality of machines associated with the identified search index. In such an embodiment, at least one processor associated with a first search index can also be associated with one or more other search indexes. In FIG. 3, an embodiment is shown that involves two indexes. When the second search index is identified as corresponding to a query, at least a portion of the query is distributed 340 to a plurality of processors associated with the second search index. At least one of the plurality of processors associated with the second search index is the same as a processor from the plurality of processors associated with the first search index. As for the first search index, responsive results are then returned by the second search index 350.

Constructing a Search Index

In various embodiments, the multiple search indexes that are served by common resources can be constructed in any convenient manner. As an example, a wide area network (such as the internet) can include billions of documents. In order to efficiently provide results to a user in response to a search query, these documents can be processed ahead of time to form a search index. This document processing can include several stages. First, the documents that should be considered for inclusion in a document corpus for a search index can be identified. Although billions of documents may be available, some of the documents may be of low interest for any of a variety of reasons. Thus, it may be desirable to have a document corpus that includes only a subset of the available documents. The identification of documents for inclusion in a search index can be performed in any convenient manner. Some documents can be excluded based on a characteristic of the document, such as whether the document is available in a default language. Other documents might be excluded based on the content of the document, such as based on whether the document has less than a threshold amount of text or data, or whether the nature of the content indicates subject matter that is inappropriate for the desired search index. Any other convenient method can also be used for identifying documents for inclusion in a document corpus.

After determining the documents that will be included in a search index, a table can be constructed that can correlate keywords with the content of documents. In this discussion, a "keyword" is generally used to refer to any string of characters or other token that can be used to identify matching documents based on a search query. Thus, a keyword could be a string of numbers, a chemical formula, or any other string that includes alphanumeric and/or non-alphanumeric characters. Keywords can also be referred to as tokens in some instances. Note that a keyword may actually represent only a portion of a conventional word, or a keyword could represent multiple conventional words. For a given keyword, the table can identify all of the documents that contain the keyword. Optionally, the table can include information about other types of document features that may be useful as part of a search process. For example, the table can further include information about how many times a keyword occurs or information about where a keyword occurs in a document. This type of table can be referred to as an inverted index.

Another process that can be performed on the documents is dividing the documents into chunks of documents. A chunk of documents can represent a group of documents that can be processed together. A chunk can include any convenient number of documents, such as tens or hundreds or thousands or more. In some embodiments, the documents within a chunk may not have any particular relationship to one another. Instead, the purpose of the chunk can simply be to split a large number of documents into groups that have a manageable size.

The formation of the inverted index and the formation of chunks can be performed in any convenient order. For example, the chunks of documents can be formed first, and then an inverted index can be formed for the documents within each chunk. Alternatively, the inverted index could be formed first. When a chunk of documents is formed, the portions of the inverted index related to the documents in the chunk can be identified and used to form a smaller table associated with the chunk.

After formation of chunks, the chunks can be distributed to a plurality of computers that can participate in generating results responsive to a search query. When the chunks are distributed to the plurality of machines, each machine can receive one or more chunks. If a machine receives more than one chunk, an inverted index can be constructed based on the combination of all of the documents received by a machine. As noted above, the exact order of operations is not critical.

The inverted index for a group of chunks can be formed by a central processor and distributed along with the corresponding chunks to a processor. Alternatively, a group of chunks can be distributed to a processor, and then the processor can build the corresponding inverted index.

The above process for forming a search index can be repeated to form different indexes. One way to have a different index is by having a different criteria for selecting documents for inclusion in a search index. For example, a restaurant search index could limit the document corpus to documents that certain keywords (such as menu, entrée, reservations) and/or links to documents containing the keywords. Another type of change in a search index can be to modify the criteria used for ranking documents. For example, a search engine focused on scientific research could give additional weight to documents that have a web domain corresponding to a known peer-reviewed journal and/or to documents with a web domain ending in "edu". Still another option can be to have a search index that is focused on a specific topic or feature. For example, an "answers database" search function could use a database of information as the document corpus. A search query could then be parsed to determine if any of the answers were ranked highly enough to be presented separately as part of the results. Other examples of specialized search indexes can include advertisement indexes, travel search indexes, or new search indexes.

Aggregation of Results

After a search index is created and distributed among multiple processors, a search query can be processed to provide responsive documents. As an example, a search query can be received from a user by a search interface, such as a web page that includes a query box. The search query can be received by a top level aggregator. Conventionally, a top level aggregator can receive a query and distribute the query to the different machines handling the chunks for a search index. A query could potentially need to be distributed to more than one group of machines in order to generate a response from more than one search index.

The query can be distributed to the machines holding chunks of documents related to a search index. The machines holding the chunks of documents can each have a service for processing a search query relative to the documents. This service can be referred to as an index file manager (IFM). The IFM can parse the query into keywords that are relevant for the particular search index, or the query parsing can be performed by the top level aggregator. After the query is parsed, the IFM on a machine can evaluate the query against the documents in the chunks associated with that machine. The IFM can evaluate the documents using a ranking algorithm to identify a group of documents on the machine that represent a highest ranked match for the query. The identified group of documents can be any convenient number, such as at least about 10 documents per machine, or at least about 20 documents per machine, or at least about 50 documents per machine, or a larger number. For example, an IFM can include a query processor that forms a query tree based on a query. The query tree can then be used to retrieve documents that match the query. The matched documents can then be ranked based on various properties, such as properties embodied in a set of relevance algorithms.

Depending on the number of documents in the search index and the number of machines that hold chunks of documents, the documents identified by each IFM can be passed through one or more layers of aggregation. If only one level of aggregation is present, the aggregation can optionally be performed by the top level aggregator. If multiple levels of aggregation are present, one or more of the intermediate levels can be performed by a mid-level aggregator. At each level of aggregation, documents from multiple machines at a lower level can be combined to form a ranked list. The ranking for the list can be based on the same ranking algorithm as the previous level. Alternatively, each level of aggregation can use additional and/or different factors in ranking the documents. For example, because the IFM performs the initial comparison of a query with the chunks of documents, the IFM could use a simplified ranking scheme to facilitate fast identification of documents. A more detailed ranking scheme could then be used by a mid-level aggregator, as the mid-level aggregator is working only with the documents surfaced by a plurality of IFMs. Optionally, the ranking scheme can vary between different aggregation levels as well.

Distributing the chunks for a search index across multiple machines can improve the speed for providing results responsive to a query. When a query is received, each machine that contains a portion of the search index can be informed of the query. Each machine can then identify a group of documents that have the highest ranking relative to the query. These documents can be aggregated, and then ranked relative to each other. More than one level of such aggregation and relative ranking can be used. At each level of document identification or ranking, the same criteria can be used, or the criteria may change at one or more levels of the aggregation process. This type of structure for identifying responsive documents can allow multiple processors to share the work of identifying the documents.

The result of the various processing steps on a document corpus can result in construction of an inverted index for the group of documents associated with a processor. Document chunks can be distributed to multiple processors, with each processor being aware of an inverted index for the chunks assigned to that machine. When a search query is received, each processor can then contribute matching documents. The matching documents can then be aggregated and ranked relative to each other. The resulting aggregated documents can then be displayed to a user based on the relative rankings.

Serving Multiple Indexes from the Same Processor

Conventionally, creating multiple indexes can require that dedicated resources are used for serving each index. When a search request is received, an initial processor can receive the request. The initial processor can then pass the request to a plurality of machines that include index file managers. Conventionally, these machines are dedicated to serving a single index. All queries received by a machine are processed using the single index.

In various embodiments, multiple index file managers can be used on a single machine. In some embodiments, each of the index file managers can be associated with a different search index. In such embodiments, when an index file manager is selected for processing of a search query, this also corresponds to selection of a search index. Similarly, when a search query request is received by a machine, the request can be processed to determine the search index corresponding to the request. The appropriate index file manager can then be used to identify matching documents. Selection of an index file manager and/or a search index the ranking algorithm for determining matching documents, as well as various other aspects of how the search query is matched with responsive documents.

The search index or search service to use for processing a request in any convenient manner. One option can be to identify the appropriate search index/service based on the method of sending the search request to the machine. For example, when a search request is forwarded to a machine, a machine port can be specified as part of the request. Each index file manager on a machine can be associated with a port, so that the machine port identifies an index. Another option can be to specify the search index as part of the search query. This can be based on information provided by the initial user or requestor, or the information can be added after the search query is received. In this type of embodiment, when a search query is forwarded to a machine, the query can be parsed to identify the appropriate index file manager. The query is then processed using the identified index file manager.

Still another option can be to specify one or more indexes as active search indexes. If only one search index is designated as an active search index, the designated active search index can be the default index for use in handling a search query. The active search index can continue as the default option until a new search index is designated as the active index. The active index can be designated, for example, by a top level aggregator sending an instruction to the search service machines regarding the search service that can be used for the next search query. In another embodiment, more than one search service or search index may be designated as active. In this type of embodiment, the search service for use in processing a search query can be selected from the active search indexes.

Example of Processing Environment for Multiple Search Indexes

Figure 4:
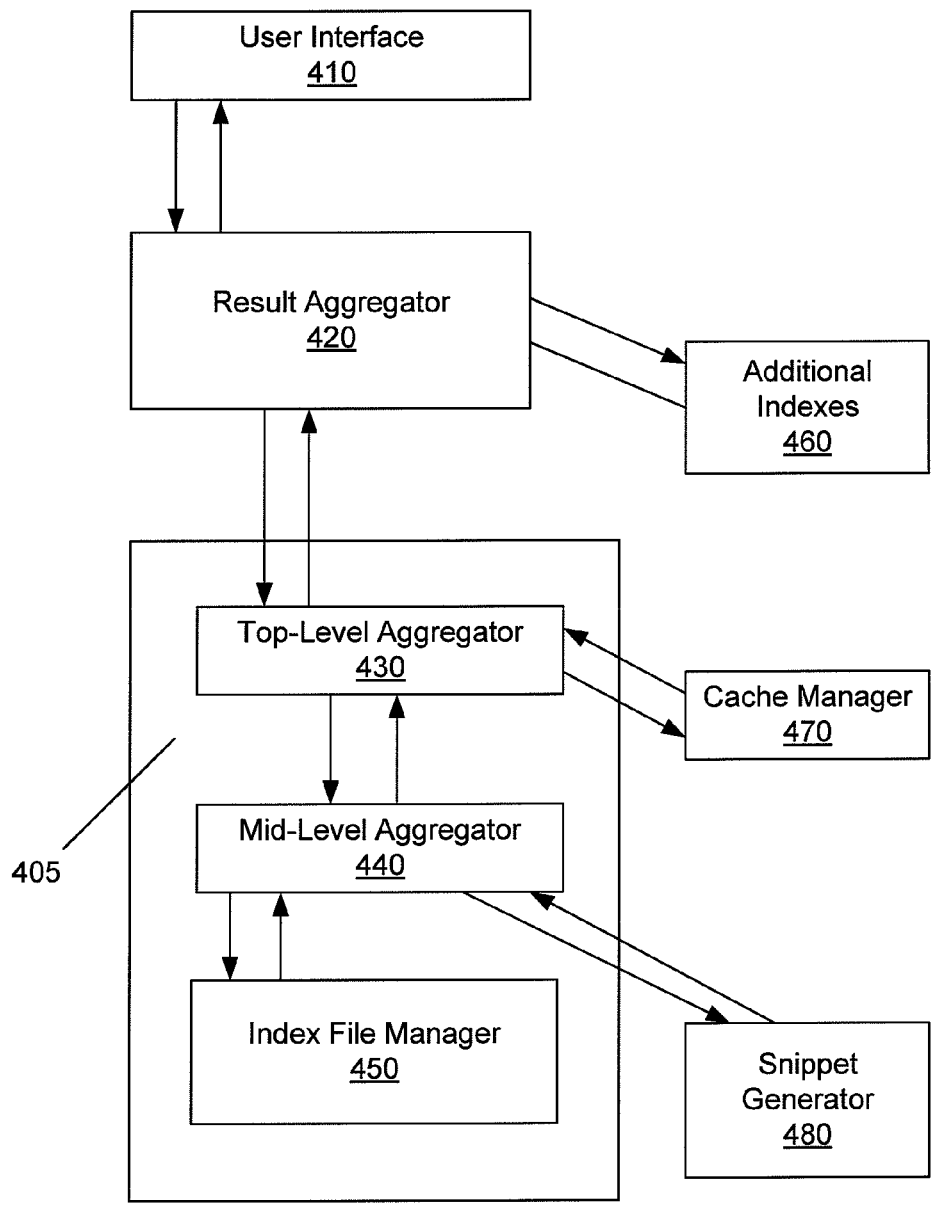
FIG. 4 shows the relationship between various components and processes involved in performing an embodiment of the invention.

FIG. 4 schematically shows an example of a processing environment for handling multiple search indexes. In FIG. 4, a user interface 410 allows a search request to be received. The search request can be a query typed by a user into a dialog box. Alternatively, the search request can be based on keywords provided to the user interface by another application.

A search request can be passed to a result aggregator 420. The result aggregator 420 can perform an initial analysis to parse the search request or query. Based on this initial analysis, the result aggregator 420 can pass the search request to one or more search indexes. One backend for a search index 405 is shown in detail. Additional indexes 460 represent any other search indexes that receive the search request from the result aggregator 420.

Search index 405 can represent one of a plurality of available search indexes. Additional indexes 460 can generically represent the other available indexes. Some additional indexes 460 can represent specialized indexes, such as indexes for providing travel information or scientific publication results. An answer index can also be used that provides a user with one or more facts as part of the search results page, without requiring the user to access a link to find desired information. Additionally, more than one search index may be available that corresponds to a given large document collection. The different search indexes for a collection may represent indexes with different weights for various ranking factors and/or indexes that are being used to test different ranking algorithms.

When a search is received by a search index 405, the index may include several levels of aggregation. In the example shown in FIG. 4, the search request from result aggregator 420 is received by a top level aggregator 430 within search index 405. In the example shown in FIG. 4, the search index also includes one or more mid-level aggregators 440 and a plurality of index file managers 450. The index file managers 450 represent multiple processors that have the same index file manager but a different portion of the document corpus (i.e., a different group of document chunks).

When top level aggregator 430 receives a search request, the request can be passed down through any optional mid-level aggregators 440 to the index file managers 450. When the search request is passed to the mid-level aggregators 440 and/or index file managers 450, the top level aggregator can include an indication of the search index handling the request. Because more than one mid-level aggregator and/or index file manager may be present on a processor or machine, the indication of the search index handling the request allows the proper mid-level aggregator or index file manager to receive the search request.

The index file managers 450 can analyze the search request in comparison with the documents that each file manager is responsible for. Based on the ranking algorithm for the search index 405, the index file managers 450 within the search index 405 can identify a plurality of potentially responsive documents. Note that the ranking algorithm applied by index file managers 450 is based on the ranking algorithm for search index 405. The ranking algorithm for index file managers 450 may be a subset and/or a modified version of the overall ranking algorithm employed by search index 405.

The index file managers within search index 405 can return the plurality of potentially responsive results to a corresponding mid-level aggregator 440. Based on the ranking algorithm for search index 405, the one or more mid-level aggregators 440 can aggregate and order the results provided from the index file managers 450. Note that the ranking algorithm applied by mid-level aggregators 440 is based on the ranking algorithm for search index 405. The ranking algorithm for mid-level aggregators 440 may be a subset and/or a modified version of the overall ranking algorithm employed by search index 405. The ranking algorithm for mid-level aggregators 440 may be the same as the ranking algorithm applied by index file managers 450, or the ranking algorithm may include additional and/or different features based on the overall ranking algorithm for search index 405. Based on the ranking algorithm employed by mid-level aggregator 440, one or more documents identified by index file managers 450 may be dropped or excluded from further consideration.

The mid-level aggregators 440 can then pass the aggregated and ranked document lists to top level aggregator 430. Top level aggregator 430 can apply the ranking algorithm of the search index 405 to merge the lists from mid-level aggregator 440 into a ranked set of results. The ranked set of results can then be provided to result aggregator 420. Result aggregator can present the results to the requestor, in combination with any other results from additional indexes 460. Optionally, if a search request is determined to be a common request, the results from top level aggregator 430 can also be stored in a cache manager 470. When a common request is received, the cache manager can be checked to determine if the search request has already been processed. If a search request has already been processed, the stored results in the cache manager can be provided to the result aggregator in place of generating a new set of results. Optionally, the search index 405 can also interact with other functions, such as a snippet generator 480. Snippet generator 480 is shown as providing snippets to mid-level aggregator 440. In alternative embodiments, snippets can be added to search results at any convenient location in the process for generating results.

Figure 5:
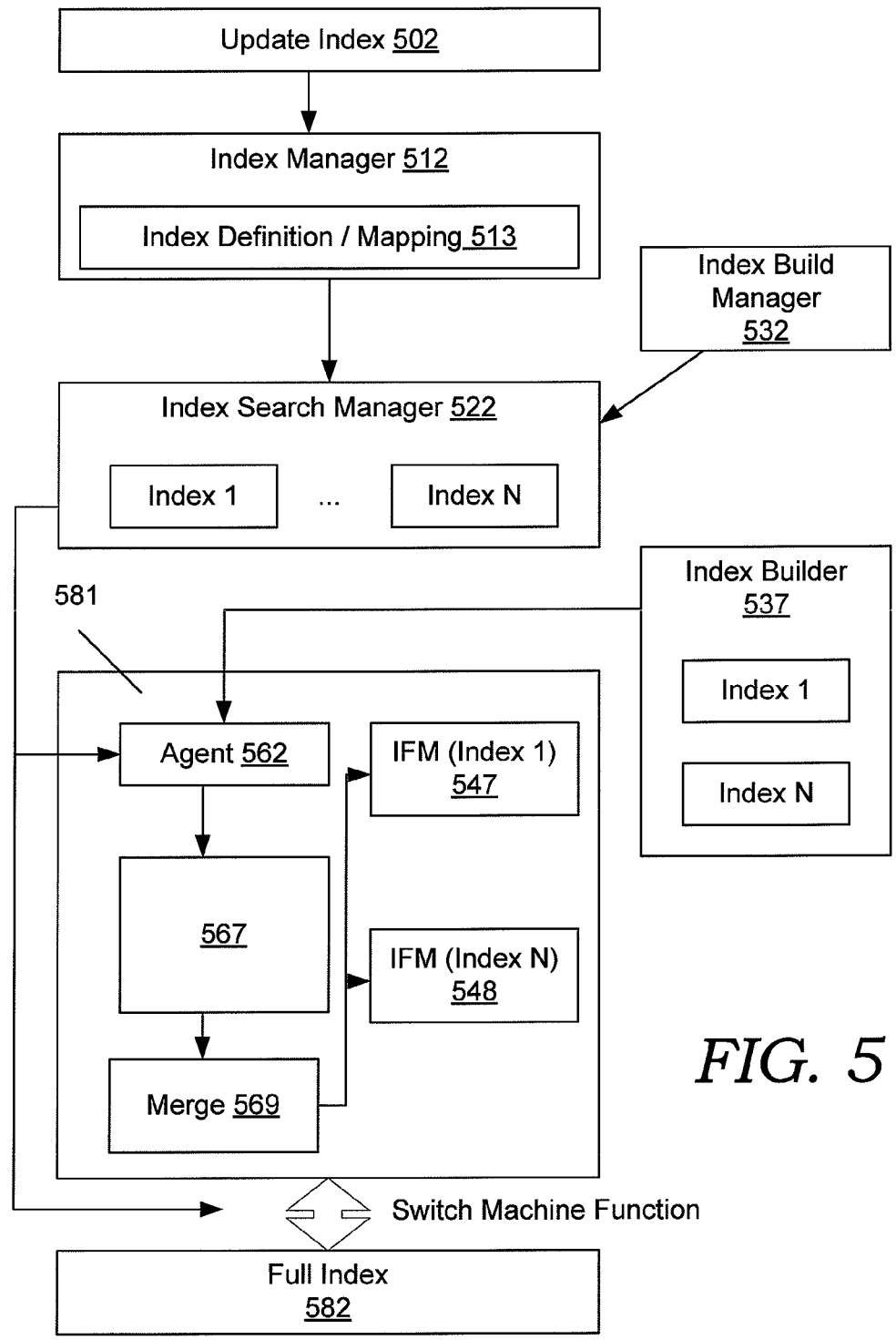
FIG. 5 shows the relationship between various components and processes involved in performing an embodiment of the invention.

FIG. 5 schematically shows an environment for updating a search index according to an embodiment of the invention. In FIG. 5, an index can be created and/or updated 502. An update for an index can occur on a periodic basis, or an index update can be triggered by a suitable event, such as an action by a system administrator. When an index is designated for creation and/or update 502, an index manager 512 can initiate the process. The index manager 512 can include an index definition and mapping component 513. The index definition and mapping component can maintain a definition of the document corpus and ranking algorithm used for an index. The index definition and mapping component 513 can also have information regarding the configuration of processors that can be used to support an index, as well as a mapping of the physical machines corresponding to the processor configuration.

When an update for an index occurs and/or when the configuration or machines for an index occurs, the index manager 512 can instruct the index search manager 522 to update one or more indexes. The index build manager 532 can provide coordination so that updates to an index occur when sufficient computer resources are available. When an index update occurs, a search agent 562 can receive input from index builder 537 and index search manager 522 to create or modify an index. The input can allow the agent 562 to determine the machines or processors that should be used for the various pieces of an index. The input from index builder 537 can allow agent 562 to update the documents and chunks in the document corpus.

Based on the chunks to be included in an index, agent 562 can distribute the chunks to various processors. One option can be to distribute chunks evenly to all processors involved in serving the index. Agent 562 can also distribute the corresponding index file manager to each processor receiving chunks for a search index. The search merge 569 can then merge the chunks on a given processor to form a single merged index that can be used by the corresponding index file manager.

In some embodiments, the index search manager can allow for a machine to switch between serving a conventional index and serving indexes that can operate at the same time on a machine.

Having briefly described an overview of various embodiments of the invention, an exemplary operating environment suitable for performing the invention is now described. Referring to the drawings in general, and initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Figure 6:
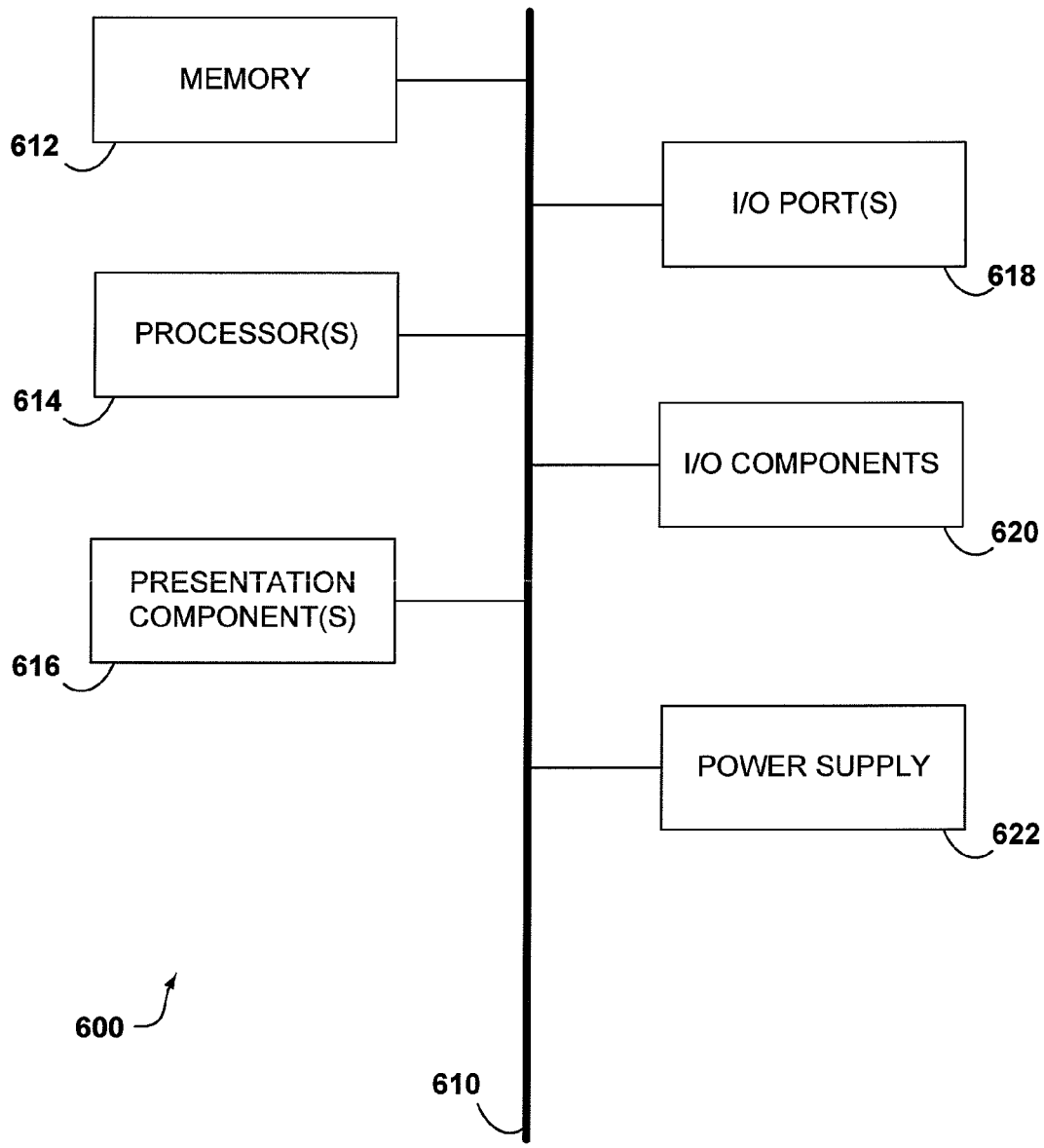
FIG. 6 is a block diagram of an exemplary computing environment suitable for use in implementing embodiments of the present invention.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

The computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, other software, and/or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 600. In an embodiment, the computer storage media can be selected from tangible computer storage media. In another embodiment, the computer storage media can be selected from non-transitory computer storage media.

The memory 612 includes computer-storage media in the form of volatile and/or nonvolatile memory. The memory may be removable, non-removable, or a combination thereof. Exemplary hardware devices include solid-state memory, hard drives, optical-disc drives, etc. The computing device 600 includes one or more processors that read data from various entities such as the memory 612 or the I/O components 620. The presentation component(s) 616 present data indications to a user or other device. Exemplary presentation components include a display device, speaker, printing component, vibrating component, and the like.

The I/O ports 618 allow the computing device 600 to be logically coupled to other devices including the I/O components 620, some of which may be built in. Illustrative components include a microphone, joystick, game pad, satellite dish, scanner, printer, wireless device, etc.

Figure 7:
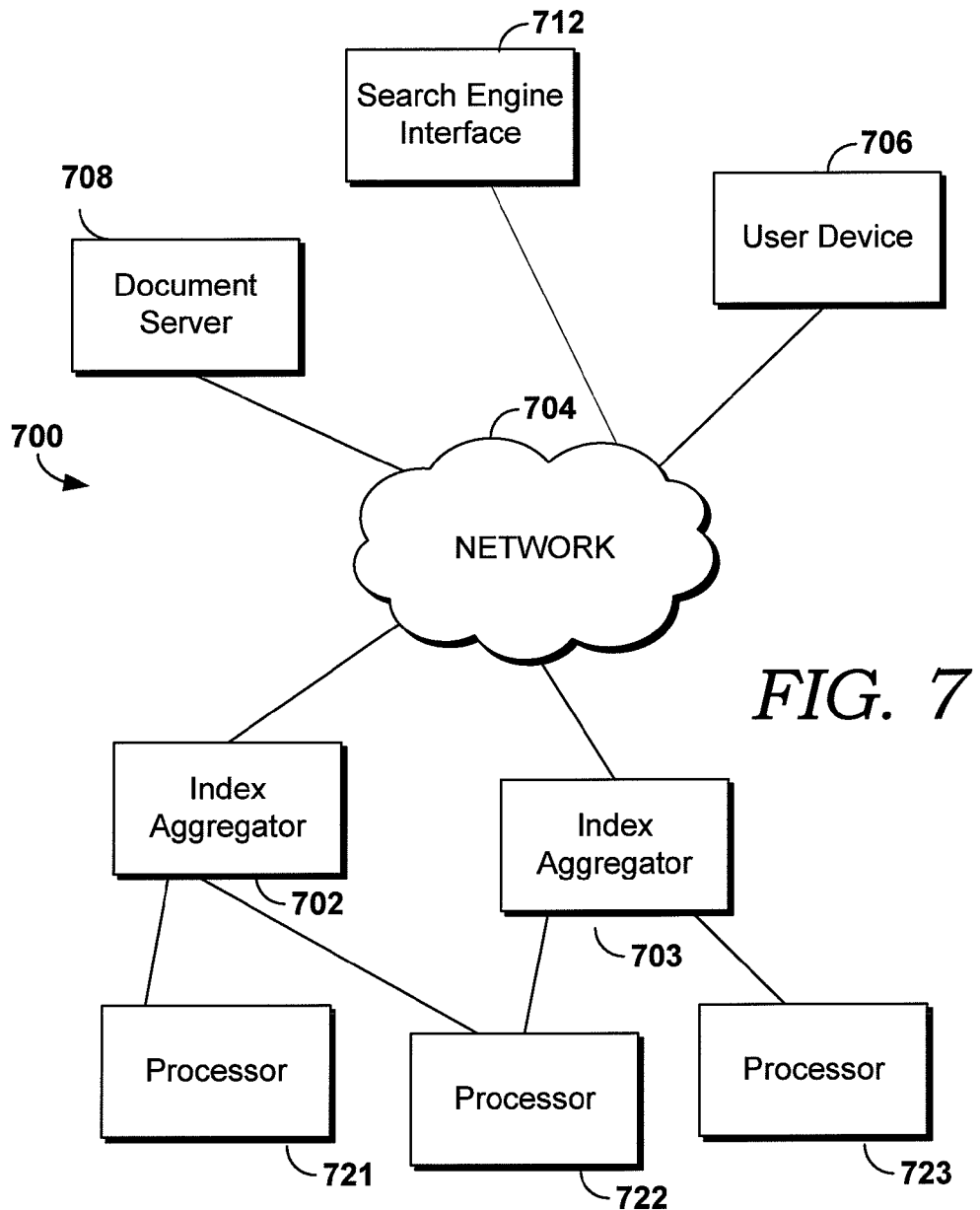
FIG. 7 schematically shows a network environment suitable for performing embodiments of the invention.

With additional reference to FIG. 7, a block diagram depicting an exemplary network environment 700 suitable for use in embodiments of the invention is described. The environment 700 is but one example of an environment that can be used in embodiments of the invention and may include any number of components in a wide variety of configurations. The description of the environment 700 provided herein is for illustrative purposes and is not intended to limit configurations of environments in which embodiments of the invention can be implemented.

The environment 700 includes a network 704, a user device 706, a document server 708 and a search engine interface 712. The network 704 includes any computer network such as, for example and not limitation, the Internet, an intranet, private and public local networks, and wireless data or telephone networks. The user device 706 is any computing device, such as the computing device 600, from which a search query can be provided. For example, the user device 706 might be a personal computer, a laptop, a server computer, a wireless phone or device, a personal digital assistant (PDA), or a digital camera, among others. In an embodiment, a plurality of user devices 706, such as thousands or millions of user devices 706, are connected to the network 704. The search engine interface 712 includes any computing device, such as the computing device 600, and provides at least a portion of the functionalities for providing a content-based search engine. Document server 708 represents any type of computer device that can provide documents selected by a user based on results responsive to a search query.

The search engine interface 712 can receive a search query from user device 706. In the embodiment shown in FIG. 7, the search query can then be passed to a top level aggregator, such as index aggregator 702 or 703. Index aggregators can process the search query by forwarding the query to processors that can use a search service to identify responsive results from chunks or groups of documents. In the embodiment shown in FIG. 7, index aggregator 702 can forward a search query to processors 721 and 722, while index aggregator 703 can forward a search query to processors 722 and 723. Processor 722 is an example of a processor that can serve multiple indexes according to an embodiment of the invention.

In an embodiment, one or more of the search engine interface 712, index aggregator 702, index aggregator 703, and processors 721-723 can be integrated in a single computing device or are directly communicatively coupled so as to allow direct communication between the devices without traversing the network 704.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A method for serving multiple search indexes comprising:
running a first search service and a second search service on a processor, the first search service and second search service having different ranking algorithms,
configuring the processor to access a subset of document chunks associated with the first search service that are less than a first full set of document chunks associated with the first search service without accessing other document chunks of the first full set of document chunks and a subset of document chunks associated with the second search service that are less than a second full set of document chunks associated with the second search service without accessing other document chunks of the second full set of document chunks, the first full set of document chunks associated with the first search service being defined as a set of document chunks corresponding to documents included in at least one inverted index associated with the first search service, and the second full set of document chunks associated with the second search service being defined as a set of document chunks corresponding to documents included in at least one inverted index associated with the second search service;

receiving at least a portion of a search query;

selecting a search service from the first and second search services for responding to the at least a portion of a search query;

processing the at least a portion of a search query using the selected search service to generate, using the processor, a plurality of responsive documents based on the subset of document chunks associated with the selected search service; and forwarding the plurality of responsive documents to an aggregator associated with the selected search service;

combining, using the aggregator, the plurality of responsive documents with other pluralities of responsive documents associated with the selected search service, the other pluralities of responsive documents being generated using processors other than the processor in the processing of the at least the portion of the search query using the selected search service.

2. The method of claim 1, wherein selecting a search service comprises determining a port used for receiving the at least a portion of a search query.

3. The method of claim 1, further comprising parsing the at least a portion of a search query to icon a plurality of keywords and/or tokens.

4. The method of claim 3, wherein selecting a search service comprises determining a search service based on at least one keyword or token from the parsed search query.

5. The method of claim 1, wherein the subset of document chunks associated with the first search service is different from the subset of document chunks associated with the second search service.

6. The method of claim 1, wherein selecting a search service comprises designating the first search service as an active search service, the first search service being active when the at least a portion of a search query is received; and selecting the first search service.

7. The method of claim 6, further comprising:

designating the second search service as an active search service;

receiving at least a portion of a second search query;

processing the at least a portion of the second search query using the second search service to generate a second plurality of responsive documents, the processing of the at least a portion of the second search query being performed in parallel with the processing of the at least a portion of the first search query; and forwarding the second plurality of responsive documents to an aggregator associated with the second search service.

8. The method of claim 1, wherein the first full set of documents associated with the first search service is different from the second full set of documents associated with the second search service.

9. A method for serving multiple search indexes comprising:

receiving a first group of document chunks;

merging the first group of document chunks to form a first merged index, the first merged index being a subset of a first search index and a portion of the first search index that a processor will handle during processing of a search query without handling all of the first search index;

storing the first merged index in storage associated with the processor;

receiving a second group of document chunks;

merging the second group of document chunks to form a second merged index, the second merged index being a subset of a second search index different from the first search index and being a portion of the second search index that the processor will handle during processing of the search query without handling all of the second search index;

storing the second merged index in the storage associated with the processor while retaining the first merged index in the storage associated with the processor;

receiving at least a portion of the search query;

parsing the at least a portion of a search query to form a plurality of keywords and/or tokens;

selecting the first merged index or the second merged index based on at least one keyword or token from the parsed query; and returning, using the processor, documents responsive to the at least a portion of a search query based on matching the at least a portion of a search query with documents from the selected merged index, the returning being to an aggregator to combine the documents with other documents returned from processors other than the processor.

10. The method of claim 9, wherein the first group of document chunks is different from the second group of document chunks.

11. The method of claim 9, wherein selecting the first merged index or the second merged index comprises:

designating the first merged index as an active index, the first merged index being active when the at least a portion of a search query is received; and selecting the first merged index.

12. A method for providing results responsive to a search query, comprising:

receiving a first search query;

identifying a first search index corresponding to the first search query;

distributing at least a portion of the first search query to a plurality of processors associated with the first search index, each of the plurality of processors having access to a respective subset of a plurality of subsets of the first search index, each of the plurality of subsets of the first search index corresponding to a respective set of document chunks;

receiving results responsive to the first search query from the plurality of processors associated with the first search index;

ranking the results responsive to the first search query;

providing the ranked responsive results in response to the first search query;

receiving a second search query;

identifying a second search index corresponding to the second search query, the second search index being different than the first search index;

distributing at least a portion of the second search query to a plurality of processors associated with the second search index, each of the plurality of processors having access to a respective subset of a plurality of subsets of the second search index, each of the plurality of subsets of the second search index corresponding to a respective set of document chunks, at least one of the processors being associated with both the first search index and the second search index;

receiving results responsive to the second search query from the plurality of processors associated with the second search index;

ranking the results responsive to the second search query; and providing the ranked responsive results in response to the second search query.

13. The method of claim 12, further comprising parsing the first search query to form a plurality of keywords and/or tokens, wherein identifying the first search index corresponding to the first search query comprises identifying an index based on at least one keyword or token from the parsed query.

14. The method of claim 13, wherein distributing at least a portion of the first search query to a plurality of processors comprises distributing at least one keyword or token from the parsed query to the plurality of processors.

15. The method of claim 12, wherein distributing the at least a portion of the second search query is performed in parallel with distributing the at least a portion of the first search query.

16. The method of claim 12, wherein a plurality of processors are associated with both the first search index and the second search index.

17. The method of claim 12, wherein a ranking algorithm for ranking results responsive to the first search query is different from a ranking algorithm for ranking results responsive to the second search query.

18. The method of claim 12, wherein providing the ranked responsive results to the first search query comprises displaying the ranked responsive results to a user that initiated the first search query.

19. The method of claim 12, wherein ranking the results responsive to the first search query comprises merging results received from the first plurality of processors to form an aggregated ranked list of results.

* * * * *